United States Patent

[11] 3,594,731

[72] Inventor Lawrence Bernstein
Livingston, N.J.
[21] Appl. No. 748,103
[22] Filed July 26, 1968
[45] Patented July 20, 1971
[73] Assignee Bell Telephone Laboratories, Incorporated
Murray Hill, Berkeley Heights, N.J.

[54] INFORMATION PROCESSING SYSTEM
6 Claims, 5 Drawing Figs.

[52] U.S. Cl. .......... 340/172.5
[51] Int. Cl. .......... G06f 3/00
[50] Field of Search .......... 340/172.5

[56] References Cited

UNITED STATES PATENTS

| | | | |
|---|---|---|---|
| 3,191,155 | 6/1965 | Seeber, Jr. et al. | 340/172.5 |
| 3,253,265 | 5/1966 | Lindquist | 340/172.5 |
| 3,292,159 | 12/1966 | Koerner | 340/172.5 |
| 3,320,592 | 5/1967 | Rogers et al. | 340/172.5 |
| 3,320,594 | 5/1967 | Davies | 340/172.5 |
| 3,389,377 | 6/1968 | Cole | 340/172.5 |
| 3,395,393 | 7/1968 | Githens | 340/172.5 |
| 3,435,423 | 3/1969 | Fuller et al. | 340/172.5 |

OTHER REFERENCES

IBM 7094 Data Processing System Reference Manual Form No. A22-6703, Oct. 21, 1966, pg. 5—7, 24, 25, 48

IBM 7094 Data Processing System Reference Manual Form No. A22-6703, Oct. 21, 1966, pg. 26, 43, 56, 58

*Primary Examiner*—Paul J. Henon
*Assistant Examiner*—Mark Edward Nusbaum
*Attorneys*—R. J. Guenther and Kenneth B. Hamlin

ABSTRACT: An arrangement for enabling the transfer of data words from any data word register in any element of a neighborhood of elements of an associative memory system to any other data word register in any element of the neighborhood. Each element comprises a plurality of data word registers. The neighborhoods, in turn, comprise a plurality of elements. A transfer register is located in each neighborhood of elements and is connected to the output leads of each element of the neighborhood such that a word retrieved from any element in that neighborhood may be registered in the transfer register. The transfer register is also connected to the input leads of the elements of the corresponding neighborhood so that any data words stored in the transfer register may be applied to any data word register of any element in the neighborhood. By utilizing the transfer register in this manner, data words which would normally be stored in a particular element but which cannot be because that element is being utilized to capacity, may be stored in some other element of the neighborhood, and then transferred to the first mentioned element when the data word is needed, for example, in a computation by the first element.

INVENTOR
L. BERNSTEIN
BY RC Lipton
ATTORNEY

PATENTED JUL 20 1971

3,594,731

SHEET 2 OF 4

INFORMATION PROCESSING SYSTEM

GOVERNMENT CONTRACT

The invention herein claimed was made in the course of, or under contract with the Department of the Army.

BACKGROUND OF THE INVENTION

1. Field of the Invention

This invention relates to memory systems and more particularly to an associative memory system.

2. Description of the Prior Art

Memory units in current use may generally be classified as either direct access memories or associative memories. In the former, each memory location is identified by a respective address, and data is written into or read out of a particular location by specifying the address. In an associative memory, on the other hand, each memory location is not provided with the respective address. Instead, each location includes both information and retrieval data. In order to retrieve stored information, retrieval data is applied simultaneously to each storage location or cell and compared with the stored retrieval data. If a match occurs between the applied retrieval data and the stored retrieval data, then the stored information in the location or cell in which the match occurred may be retrieved. Arithmetic operations may likewise be carried out on an associative basis. That is, locations or cells which are to participate in a given operation can be specified by comparing applied retrieval data with stored retrieval data. The cells or groups of cells in which a match occurs are then activated to perform operations as directed by a common control unit. An exemplary associative memory system of the type described above is disclosed in a copending application by J. A. Githens, Ser. No. 487,179, filed Sept. 14, 1965 now U.S. Pat. No. 3,395,393, issued July 30, 1968.

Associative memory systems may advantageously be organized into groups of data registers such that each group is arranged to operate on its own set of data. That is, the data registers are organized into groups of data registers such that each register in a group is logically associated with the other registers in the group to enable the processing of data applied thereto or stored therein. Such groups of data registers will hereafter be referred to as memory elements. Each element operates in parallel with the other elements and is controlled by a common control unit. The size of the elements (all elements being equal) would depend on how much data were to be processed by each element. The number of elements, of course, would depend on the number of different groups of data which were to be processed in parallel. If it were desired to increase the processing capacity of the memory, modification of the memory would be required. Increasing the number of groups of data which could be processed would simply require the addition of new elements. Increasing what will be called the functional capacity of each element, i.e., the amount of data each element can process, could be done by adding data registers to each of the elements. This, however, would be costly since a considerable amount of alteration or rewiring would be required as will be evident from the discussion hereafter of an illustrative memory system.

SUMMARY OF THE INVENTION

In view of the above described prior art systems, it is an object of the present invention to provide an associative memory system wherein the functional capacity of each element of the system may be increased in an efficient and economical manner.

Another object of this invention is to provide an associative memory arrangement wherein data words may be transferred from any element of a group of elements to any other element of the group.

These and other objects of the present invention are illustrated in a specific embodiment which comprises a plurality of memory elements of a type similar to those disclosed in the aforecited Githens patent. Each element comprises a plurality of data word registers for registering data. Processing of the data by the memory elements is carried out in parallel under the control of a common control unit. The memory elements are, in turn, organized into groups of memory elements which will hereafter be referred to as neighborhoods. Each neighborhood might, for example, comprise four, five, etc. memory elements. Associated with each neighborhood of elements is a register which will hereafter be referred to as the transfer register which is connected to the output leads of all memory elements. Any data word read from any memory element in any neighborhood may, as determined by the common control unit, be automatically registered in the transfer register associated with that neighborhood. The transfer register is also connected to the input leads of the memory elements of the corresponding neighborhood so that any data word stored in the transfer register may, again as determined by the common control unit, be applied to any memory element in the neighborhood.

By utilizing the transfer register in the above described manner, the functional capacity of the memory elements in a neighborhood may be increased. That is, data words which would normally be stored in a particular memory element but which cannot be so stored because that element is being utilized to its capacity, may be stored in some other element of the neighborhood and then transferred to the first mentioned element when the data word is needed, for example, in a computation performed by the first element. This is done by first designating one element in each neighborhood as the element which will store "overflow" data words from the other elements of the neighborhood. When these other elements then become filled (a record of the amount of data stored in the elements is maintained in the common control unit), subsequent data words which would normally be stored in these elements are stored in the designated element. When the "overflow" data words are thereafter required by the different elements, the words are transferred from the designated element via the transfer register to the other elements. This transfer of data words between memory elements in a neighborhood may be carried out simultaneously in all the neighborhoods of the system. In the above manner, the amount of data which may be processed by each element (except for the so-called "overflow" element) is increased.

BRIEF DESCRIPTION OF THE DRAWINGS

A complete understanding of the present invention and of the above and other objects and advantages thereof, may be gained from a consideration of the following detailed description of a specific illustrative embodiment presented hereinbelow in connection with the accompanying drawings described as follows.

DETAILED DESCRIPTION

Figure 1:
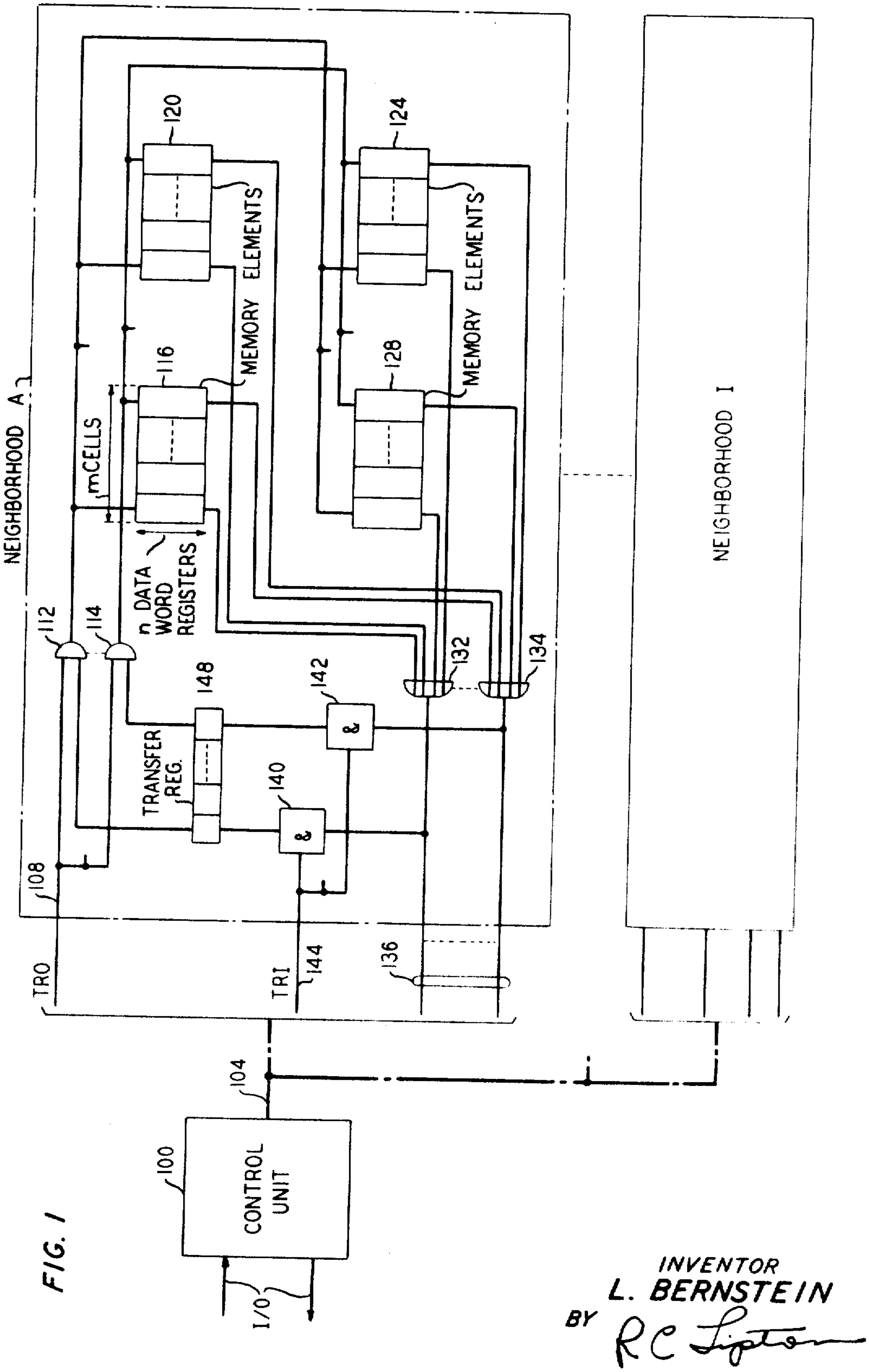
FIG. 1 shows an associative memory system made in accordance with the principles of the present invention.

Figure 1 shows a block diagram of an associative memory system which utilizes transfer registers in accordance with the present invention. The system includes a control unit 100 which controls the processing of data in all memory elements of the system in a manner essentially the same as that of the input control and signal source 11 of Figure 1 of the above-cited Githens patent. Data to be applied to and read from the system are transferred over the input-output leads (labeled I/O) connected to the control unit 100. The control unit 100 is connected via a data and control signal bus 104 to a plurality of neighborhoods—Neighborhood A through Neighborhood I. Each neighborhood in turn comprises a plurality of memory elements, each of which, in turn, comprises a plurality of data cells of the type disclosed in the aforecited Githens patent. Neighborhood A of FIG. 1 illustratively comprises four memory elements, 116, 120, 124 and 128 each of which, in turn, comprises *m* data cells. The data cells, in turn each, comprise *n* bit positions or bit registers. Each of the bit registers of a cell belongs to a different data word register. Thus corresponding bit positions or bit registers in each of the *m* cells comprise data word registers. The memory elements may thus be viewed as comprising either *m* cells (vertical "slices") or *n* data word registers (horizontal "slices"). Output leads from corresponding cells of each memory element are connected via OR gates 132—134 and AND logic 140—142 to corresponding register positions of a transfer register 148. (AND logic 140—142 is shown rather than a simple AND gate since the logic comprises more than a simple AND gate as will be shown when discussing FIG. 4.) With this arrangement, a data word from any of the memory elements in neighborhood A may be transferred and registered in the transfer register 148.

Operation of the system will now be described with reference to Neighborhood A of FIG. 1 although it is to be understood that the other neighborhoods operate in similar fashion and in parallel with Neighborhood A. Associative techniques as described in the aforecited Githens patent and as to be discussed hereafter are utilized to designate the memory element(s) from which a data word or words are to be read. The designation of a particular memory element is carried out under the control of the control unit 100. After a memory element is so designated, the control unit causes the data word to be read from the element and applied to OR gates 132—134 and to AND logic 140—142. Application of a "Transfer Register Input" pulse via lead 144 to the AND logic 140—142 in conjunction with the application of the data word thereto causes the data word to be applied to and registered in the transfer register 148. The data word so transferred also appears on output leads 136 where the word may be utilized by the control unit 100.

After a data word is registered in the transfer register 148, the control unit 100 may then designate a particular memory element to which the data word is to be transferred. Designating such a memory element is carried out, again, by associative techniques. After a memory element is designated, the control unit 100 applies a "Transfer Register Output" pulse via lead 108 to AND gates 112—114 thereby causing transfer of the data word registered in the transfer register 148 to the designated memory element. The transfer of a data word in the above described manner also requires that the control unit 100 pulse other control leads, for example, to designate the data word registers of the designated memory elements from which and to which the data word is to be read and applied respectively. (These leads were not shown in FIG. 1 but will be shown in reference to other figures.) Since the control signals and associative information or data is applied to all neighborhoods and all elements in the neighborhoods simultaneously, the process of transferring a data word from one memory element to another memory element in the same neighborhood may be carried out simultaneously in all neighborhoods.

In the manner described above, the so-called functional capacity of the memory elements may be expanded by simply utilizing one of the memory elements in a neighborhood to store overflow data words or information. The control unit maintains a record of the amount of data stored in the elements and when the elements become filled, subsequent data is stored in the overflow memory element. When it is desired to process or interact the overflow data words with the data words stored in the memory element in which the overflow data words would have been stored, the overflow words are transferred from the overflow memory element via the transfer register to the associated memory element for processing. This arrangement, as mentioned earlier, avoids the requirement of adding additional logic and circuitry to the memory elements in order to increase the functional capacity of the elements.

Figure 2A:
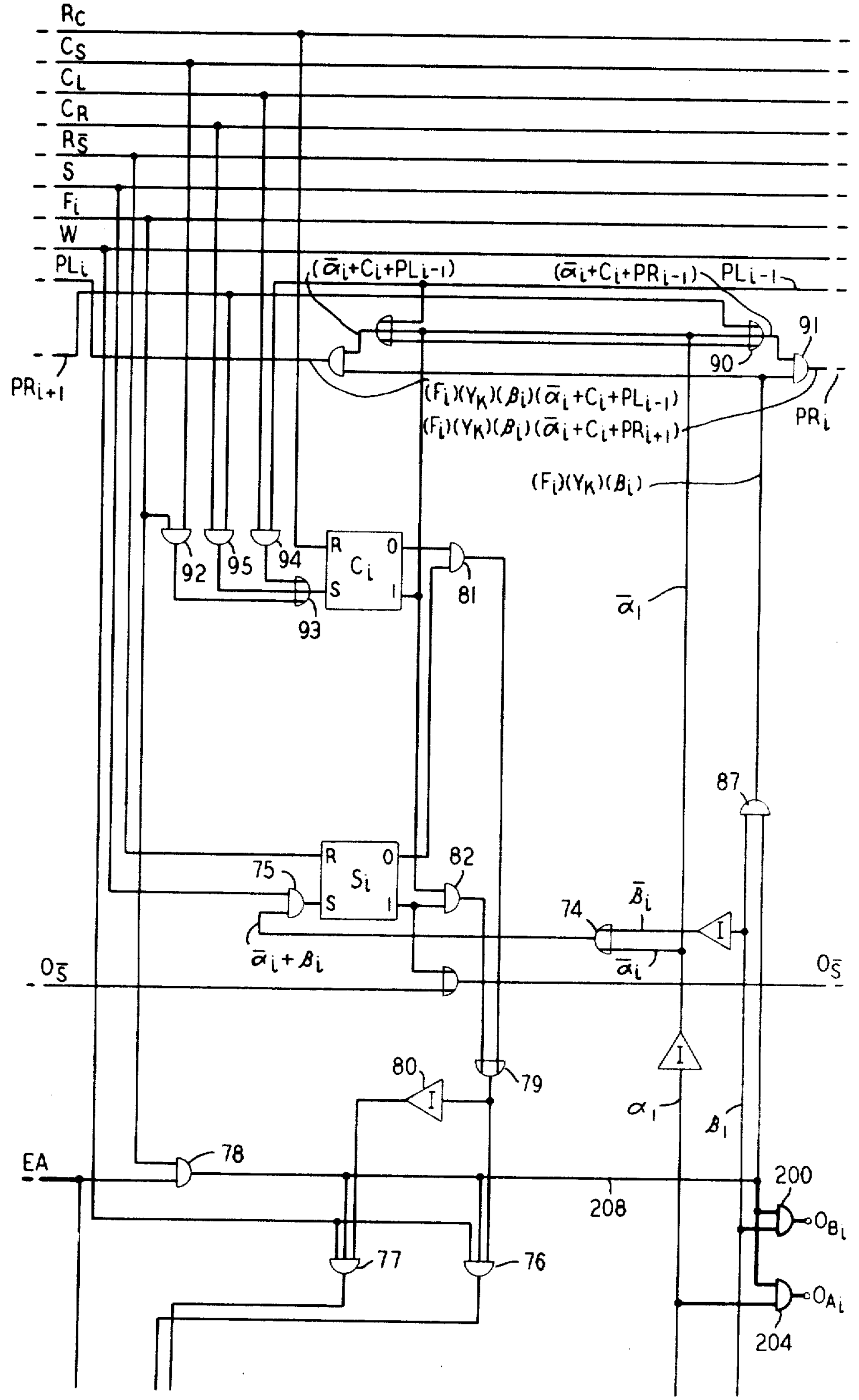
FIGS. 2A and 2B with FIG. 2A placed on top of FIG. 2B show a memory cell of the type described in the aforecited Githens application which has been modified in accordance with the principles of the present invention.
Figure 2B:
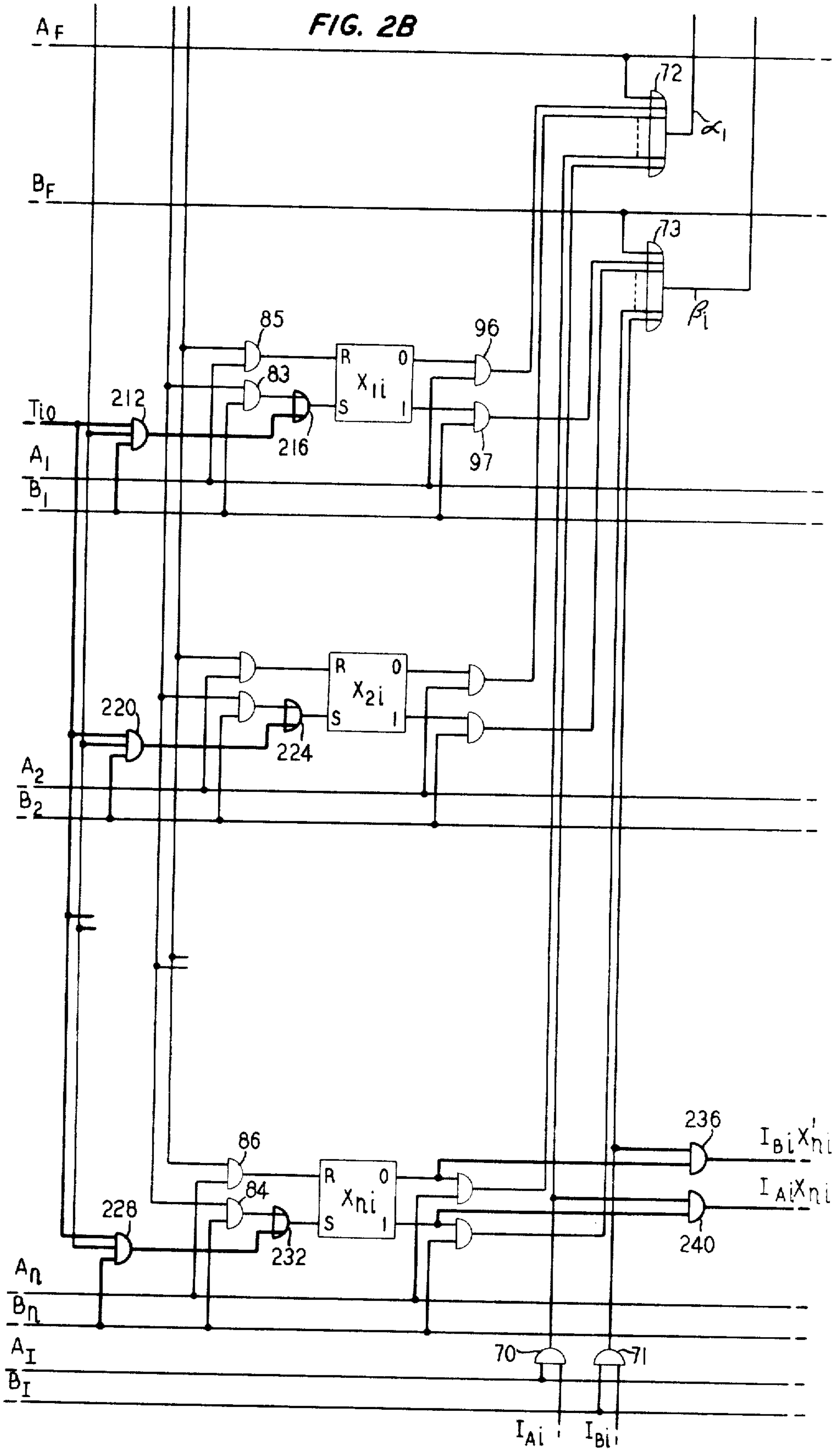

FIGS. 2A and 2B with FIG. 2A placed on top of FIG. 2B shows an illustrative data cell or vertical "slice" of a memory element. This cell is essentially the same as that shown in FIGS. 8 and 9 of the aforecited Githens patent. In particular, the signals denoted by letter designations in FIGS. 2A and 2B of the present invention, for example, $R_C$, $C_L$, $C_S$, etc., are generated just as the identically designated signals of FIGS. 8 and 9 of the Githens patent. Several new leads and gates have been added to the Githens cell in accordance with the principles of the present invention and these are shown in FIGS. 2A and 2B in heavier line drawing. The newly added leads and gates and their respective functions are as follows. Lead EA terminating in AND gate 78 of FIG. 2A and in AND gates 212, 220, and 228 of FIG. 2B is present in the Githens cell but is not labeled as such. Lead EA (Element Activity) is high when the memory element to which the cell belongs has been designated for the performance of certain operations. Such designation is carried out on an associative basis and will be discussed later on. Leads $O_{Bi}$ and $O_{Ai}$ derived from AND gates 200 and 204, respectively, are the output leads for the cell of FIGS. 2A and 2B. The subscript *i* used in reference to FIGS. 2A and 2B is adopted to maintain consistency with the description in the Githens patent and indicates that the cell being discussed is cell *i*. The data stored in any of the bit registers of the cell may be read from the cell via these leads. For example, if the data were to be read from the bit register $X_{1i}$, leads $A_1$ or $B_1$ would be pulsed thereby enabling either AND gate 96 or AND gate 97 depending on what was registered in the bit register $X_{1i}$. If a "1" were registered in bit register $X_{1i}$, then AND gate 97 would be enabled thereby enabling OR gate 73 causing a high on lead $\beta_i$. Further, if lead EA were high and lead $F_i$ were pulsed, AND gate 78 would be enabled producing a high on lead 208. A high on lead $\beta_i$ in conjunction with a high on lead 208 would cause AND gate 200 to be enabled thereby generating an output on lead $0_{Bi}$ indicating, therefore, the registration of a "1" in bit register $X_{1i}$. Similarly, if a high were obtained over lead $0_{Ai}$, this would indicate the registration of a "0" in bit register $X_{1i}$. Lead $T_{io}$ of FIG. 2B is the lead over which information or data is transferred from the transfer register associated with the cell in question to the various bit registers of the cell. That is, data from the $i^{th}$ bit position of the transfer register would be transmitted via lead $T_{io}$ to whichever bit register of the cell of FIGS. 2A and 2B were designated for the receipt of such information. Such a transfer of data from the transfer register, as indicated earlier, is carried out by first designating the memory element to which this data is to be transferred. This is done by associative techniques, the result of which lead EA is made high in the memory element so designated. A high on lead EA coupled with a high on the appropriate one of leads $B_1$, $B_2$, ...$B_n$, together with the data received via lead $T_{io}$ enables the appropriate one of AND gates 212, 220, ...228 to thereby enable the appropriate one of OR gates 216, 224, ...232. In this manner, data received from the transfer register is registered in one of the bit registers $X_{1i}$, $X_{2i}$, ...$X_{ni}$. Finally, leads $I_{Bi}X'_{ni}$ and $I_{Ai}X_{ni}$ of FIG. 2B are utilized to indicate the result of a comparison between the contents of bit register $X_{ni}$ and match information applied via leads $I_{Ai}$ and $I_{Bi}$. As indicated in the Githens patent, leads $I_{Ai}$ and $I_{Bi}$ may be derived from either a so-called second dimensional cell associated with the cell of FIGS. 2A and 2B or from an external source. In the present arrangement, these leads would be derived from a common control unit. If lead $I_{Ai}$ is made high while lead $I_{Bi}$ remains low, the applied data represents a "0." If, on the other hand, lead $I_{Bi}$ is made high while lead $I_{Ai}$ remains low, the applied data represents a "1." Assume that the applied data represents a "1" in which case lead $I_{Bi}$ in conjunction with the high on lead $B_i$ enables AND gate 71. If the bit register $X_{ni}$ is storing a "0," then AND gate 236 is enabled, causing a high on lead $I_{Bi}X'_{ni}$. Similarly, if the bit register $X_{ni}$ is storing a "1" and a "0" is applied via lead $I_{Ai}$, lead $I_{Ai}X_{ni}$ is made high. Thus, a high on either lead $I_{Bi}X'_{ni}$ or $I_{Ai}X_{ni}$ indicates the occurrence of a mismatch.

Figure 3:
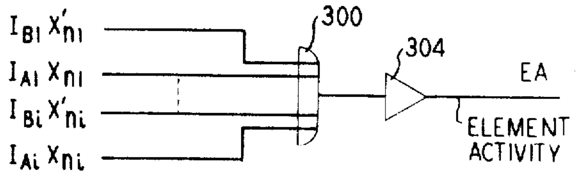
FIG. 3 shows a circuit for generating an indication of the element activity of the memory elements.

Leads $I_{Bi}X'_{ni}$ and $I_{Ai}X_{ni}$ along with the corresponding leads derived from the other $X_n$ bit registers of the element terminate in an OR gate 300 shown in FIG. 3. If a mismatch has occurred between any applied match data and any data stored in any of the $X_n$ bit registers, then one of the leads terminating in the OR gate 300 will enable the OR gate causing a high output which is then inverted by an inverter 304 making lead EA low. It is in this manner that the memory elements which are to participate in a given operation can be designated. That is, a match word is applied to each of the memory elements and compared with a data word in the $X_n$ bit registers, i.e., the $n^{th}$ data word register. If the applied data matches the stored data, then none of the leads $I_BX'_n$ or $I_AX_n$ are made high, therefore, lead EA is made high, indicating that the memory element in question is to participate in the given operation. Such an operation might, for example, be the transfer of a data word from a designated memory element to the transfer register or the subsequent transfer of the data word from the transfer register to another designated memory element. As has been indicated throughout, these operations may be carried out in parallel in the various neighborhoods, all under the control of the control unit.

Figure 4:
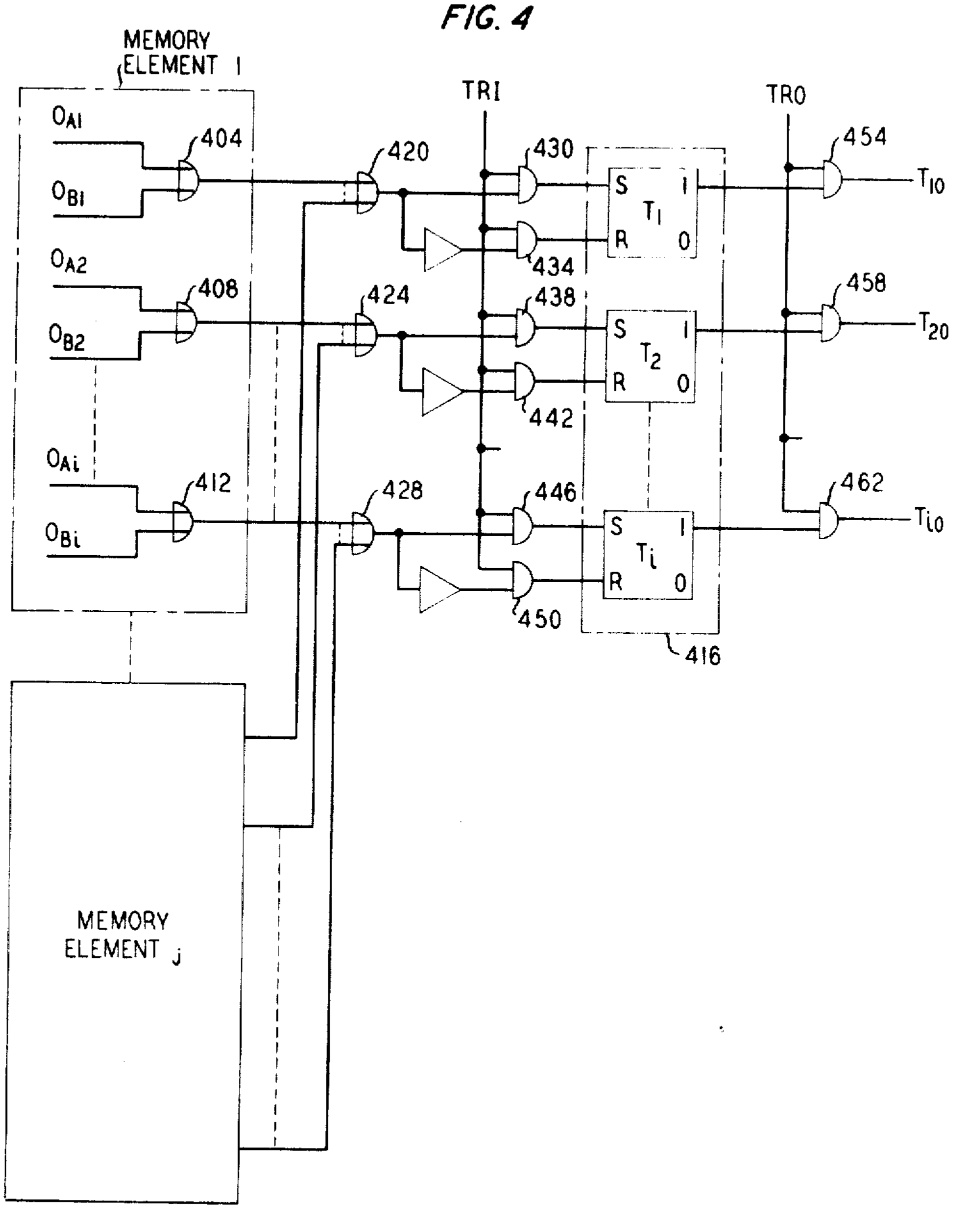
FIG. 4 shows illustrative detailed circuitry of a transfer register and its connections with memory elements.

FIG. 4 shows illustrative detailed circuitry for transferring data words from various elements in a neighborhood to the transfer register associated with that neighborhood. The complete operation of transferring a data word from a memory element to the transfer register and then to another memory element will now be described with reference to FIGS. 2A, 2B, 3 and 4. The initial step is to designate that memory element from which the data word is to be read. This is done by associating a match word with each of the data words registered in the $n^{th}$ data word register of each memory element of each neighborhood. Since each memory element of any neighborhood would contain a different data word in its $n^{th}$ data word register, the applied match word will match at most only one of the stored data words in each neighborhood and thus the EA lead in only one of the memory elements of each neighborhood will be made high as a result of this comparison. After a memory element has been designated, the control unit 100 may read a data word from whichever data word register of the designated memory element desired. This is done by pulsing the $F_i$ lead (FIG. 2A) and the appropriate A or B leads (FIG. 2B). The desired data word is thus read via the $0_A$ or $0_B$ leads (FIGS. 2A and 4) of the designated memory element. The data word is then applied via OR gates, such as OR gates 404, 408 ...412 of FIG. 4 (assuming that memory element 1 of FIG. 4 was the designated memory element) to OR gates 420, 424, ...428. The output of each of these OR gates in conjunction with a pulse on lead TRI enables either one of two AND gates connected to each of the bit registers of the transfer register 416. If, for example, OR gate 420 were enabled, then the high output from the OR gate in conjunction with a high on lead TRI would cause the enablement of AND gate 430 thus setting the $T_1$ bit register of the transfer register 416. On the other hand, if OR gate 420 were not enabled, then the low output from this OR gate would be inverted by the inverter to a high condition and would in conjunction with a high on lead TRI enable AND gate 434 thus resetting the $T_1$ bit register of the transfer register 416. It is noted here that the output leads of the cells of each of the memory elements are doublerail. This means that the reading out of either a "0" or a "1" from a particular bit register would cause the setting of the corresponding bit register of the transfer register. Generally speaking, of course, it would be of interest only to read out "1's" from the memory elements thereby setting the corresponding bit registers of the transfer register 416. If "0's" were stored in the data word register from which the data word were being read, then no output would occur on the output leads and therefore the corresponding bit register of the transfer register would be reset.

Transfer of the data word from the transfer register to a memory element is carried out by first designating the memory element to which the data word is to be transferred. This is done, again, on an associative basis. That is, a match word is applied to every memory element of each of the neighborhoods and compared with the data word stored in the $n^{the}$ data word register of the elements. The EA lead in those elements in which a match occurs is made high. It is possible, of course, that more than one memory element of a neighborhood is to be designated in which case the data word would ultimately be read into all of such designated elements. After the memory element or elements of the different neighborhoods into which the data words are to be read are designated, the control unit applies a pulse over lead TRO FIG. 4) causing the data word stored in the transfer register to be gated onto $T_{1o}$, $T_{2o}$, ...$I_{io}$. This data word is then registered in the appropriate data word register of the designated memory element or elements by the control unit pulsing the appropriate one of leads $B_1$, $B_2$, $B_n$ (FIG. 2B). Pulsing the appropriate B lead in conjunction with a "1" being transmitted via lead $T_{io}$ and a high on lead EA causes one of AND gates 212, 220, and 228 to be enabled thereby enabling one of OR gates 216, 224, ...or 232 and thus setting one of the bit registers of the cell of FIGS. 2A and 2B. This completes the transfer of the data word from one memory element to another memory element in accordance with the present invention.

It is noted here that the general operation of the cell shown in FIGS. 2A and 2B is not given since a complete explanation can be found in the Githens application.

Finally, it is understood that the above described arrangement is only illustrative of the application of the principles of the present invention. Numerous modifications and alternative arrangements may be devised by those skilled in the art without departing from the spirit and scope of the invention.

I claim:

1. In an information processing system comprising a plurality of memory groups, each group comprising a plurality of memory elements, each element, in turn, comprising a plurality of data word registers, and means for applying data words simultaneously to said elements and for retrieving data words therefrom, sensing means for sensing which of said data word registers include data words, a plurality of transfer registers each associated with a different memory group and connected to each of the elements of said group for registering data words retrieved from said elements in response to said sensing means, and means responsive to said sensing means for applying data words registered in each of said transfer registers to any element in the associated memory group whereby a data word to be applied to an element is registered in said transfer register for subsequent application register in any element in the memory group, the vacancy of said data word registers being indicated by said sensing means.

2. In an information processing system comprising a plurality of memory elements, each element comprising a plurality of data registers for registering data words, control means for applying control signals simultaneously to each of said elements for determining which of said data registers includes data words, means for applying data signals simultaneously to all of said elements, and means for retrieving data signals therefrom, transfer register means responsive to said control means for registering data words retrieved from any particular data register of any particular memory element, and means for applying said data words registered in said transfer register to any data register of any element.

3. An improved information processing system comprising a plurality of memory elements, each element comprising a plurality of adjacent data cells, each cell, in turn, comprising a plurality of bit registers, a control unit for applying control signals and data signals simultaneously to all of said elements, means in each of said elements for comparing applied data with stored data and for indicating a match or a mismatch therebetween, and means in said elements responsive to said control signals and to a match indication for causing data to be read from said element in which a match occurs wherein said improvement comprises at least one transfer register which, in turn, comprises bit registers each of which is connected to selected ones of said cells of each memory element, means responsive to said control signals for causing data read from said elements to be registered in said transfer register and means responsive to said control signals for causing data stored in said transfer register to be applied to any of said elements.

4. In an information processing system comprising a plurality of memory groups, each group comprising a plurality of memory elements, each element comprising a plurality of data word registers for storing a number of data words, apparatus for increasing the number of data words which each memory element may process comprising, sensing means for determining which of said data word registers include data words, a plurality of transfer registers each of which is associated with a different memory group and each of which is connected to each of the elements in said group, means responsive to said sensing means for designating a single element in each of said groups from which a data word is to be read or to which data a data word is to be applied, and means responsive to said sensing means for applying data words read from said designated elements to the associated transfer registers.

5. A system as in claim 4 further comprising means for reading data from said transfer registers and for applying said data to corresponding designated memory elements.

6. In an information processing system comprising at least one group of memory elements, said group comprising a plurality of memory elements each of which comprises a plurality of data word registers and logic for processing data stored therein, a method for increasing the functional capacity of said elements comprising the steps of ascertaining the storing capacity of said elements transferring data words from the elements in a group to a transfer register associated with the group when the data storing capacity of said elements is exceeded, registering said data words in a designated element, reading said data words from said designated element into said transfer register and then from said transfer register into that element in said group with which said data word is associated for processing.